United States Patent [19]

Uglene et al.

[11] Patent Number: 5,267,519
[45] Date of Patent: Dec. 7, 1993

[54] VAPOR PERMEABLE BUOYANT INSULATION COMPOSITION FOR GARMENTS AND THE LIKE

[75] Inventors: Wendell V. Uglene, Burnaby; Brian Farnworth, Delta, both of Canada

[73] Assignee: M.E.T.A. Research Inc., Canada

[21] Appl. No.: 790,325

[22] Filed: Nov. 12, 1991

[51] Int. Cl.⁵ .................................... B32B 7/08
[52] U.S. Cl. ........................... 112/440; 112/420; 428/102; 428/138
[58] Field of Search ............ 112/440, 420, 402; 428/102, 137, 138, 253, 300; 28/109; 66/190, 196

[56] References Cited

U.S. PATENT DOCUMENTS

| | | | |
|---|---|---|---|
| 1,889,997 | 12/1932 | Mudd | 28/109 |
| 3,354,020 | 11/1967 | Copeland | 28/109 X |
| 3,405,674 | 10/1968 | Coates et al. | 428/102 |
| 3,819,465 | 6/1974 | Parsons et al. | 28/109 X |
| 4,039,709 | 8/1977 | Newman | 112/440 X |
| 4,232,620 | 11/1980 | Kurz | 428/102 X |
| 4,469,740 | 9/1984 | Bailly | 428/300 X |
| 4,530,873 | 7/1985 | Okada | 428/253 |
| 4,608,298 | 8/1986 | Klaff | 428/102 X |
| 4,756,937 | 7/1988 | Mentzer | 428/2 X |
| 5,021,280 | 6/1991 | Farnworth . | |

Primary Examiner—Clifford D. Crowder
Assistant Examiner—Paul C. Lewis
Attorney, Agent, or Firm—Townsend and Townsend Khourie and Crew

[57] ABSTRACT

A vapor permeable buoyant insulation composition suitable for floatation garments and the like is impermeable to water, and yet allows the escape of perspiration when the composition is used in garments or boots. The composition comprises a closed-cell insulating foam which has a plurality of holes distributed throughout, first and second layers of fabric, one layer on each side of the foam, and stitching pattern throughout the composition causing the first and second layers to be in contact at the holes in the foam.

9 Claims, 1 Drawing Sheet

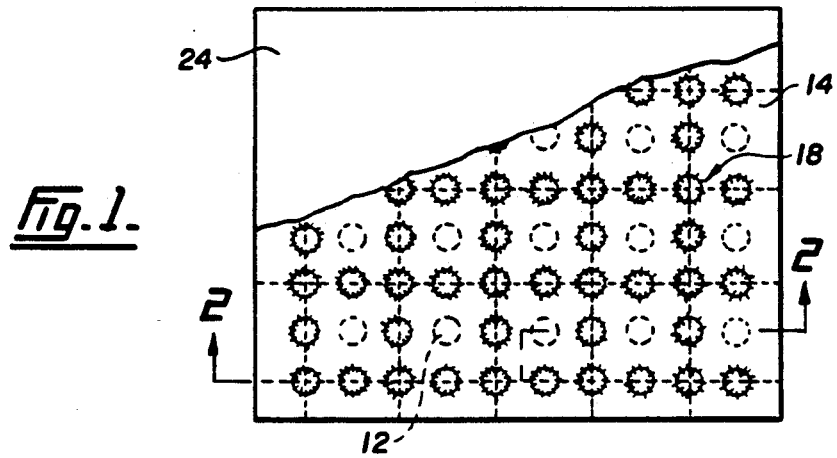
*Fig.1.*
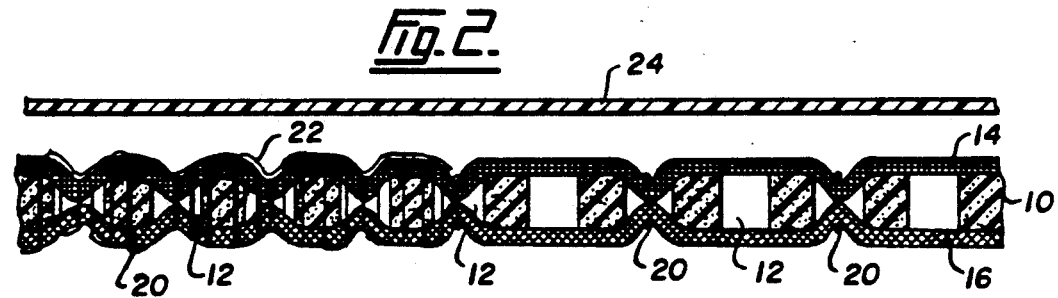
*Fig.2.*
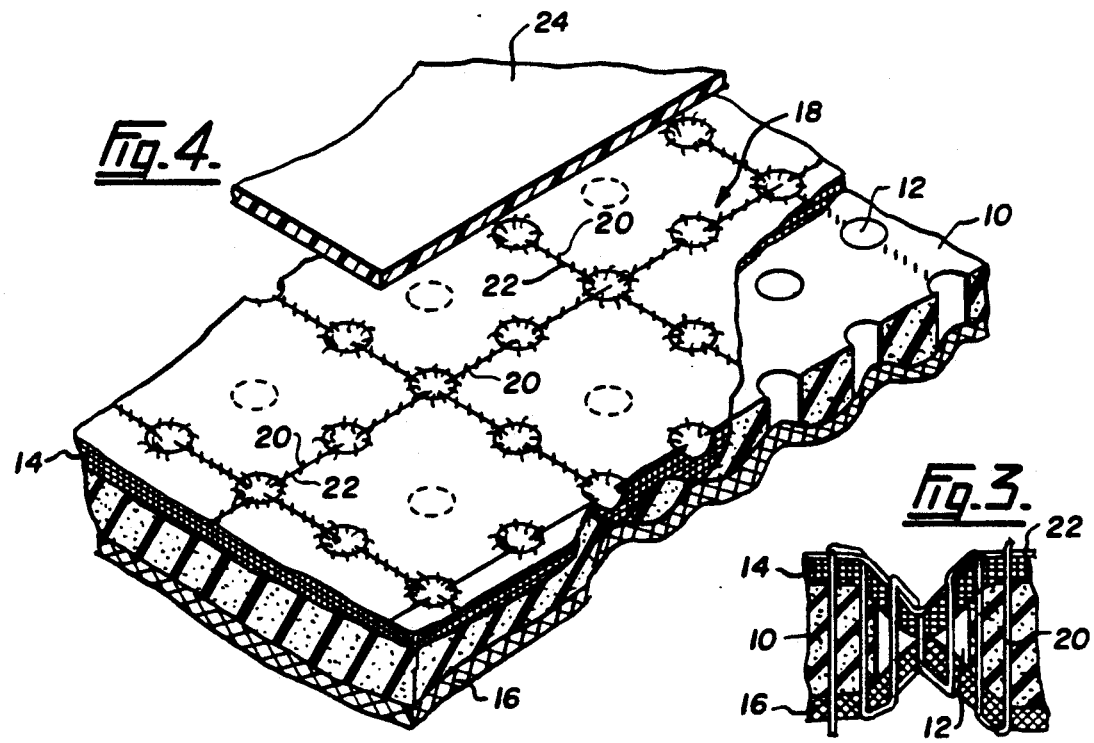
*Fig.4.*
*Fig.3.*

VAPOR PERMEABLE BUOYANT INSULATION COMPOSITION FOR GARMENTS AND THE LIKE

TECHNICAL FIELD

The present invention relates to protective waterproof, water-vapour permeable buoyant insulation material suitable for use in garments for cold weather and immersion in water.

BACKGROUND ART

Insulated clothing is used in cold weather conditions and particularly for clothing that seals to the ankles, wrists and neck of an individual to protect the body from hypothermia when immersed in cold water. Suits and boots are made from insulated material and are used by both military and civilian personnel in many situations. The insulation is generally in the form of a closed-cell foam material as this material maintains insulating properties when immersed since water cannot penetrate into the cells and furthermore closed-cell foam retains buoyancy properties when immersed thus providing some buoyancy for an individual in the water.

Insulated fabrics are generally made with closed-cell foam materials. One example of such a fabric is disclosed in U.S. Pat. No. 5,021,280 to Farnworth et al. This fabric is suitable for garments or boots and provides warmth through insulation, is impermeable to water, particularly under immersion conditions, and yet allows the escape of perspiration when the garments or boots are not immersed in water.

DISCLOSURE OF INVENTION

The present invention provides a buoyant insulation composition suitable for garments and boots which has evaporative apertures in a closed-cell insulating foam that provides greater ease of movement and comfort to the garment user and also allows the material to dry faster through the evaporative (both instances). These apertures are not the closed cell holes that are already present in the foam. These evaporative holes increase the heat loss through the material during times when the garment user experiences higher metabolic heat production due to increased physical activity and this reduces the potential overheating problems.

Stitching passes through the apertures in the foam and this stitching cause the layers of fabric on opposite sides of the foam to be in intimate contact. This in turn increases the passage of water or perspiration through the material.

The present invention provides a buoyant, insulation composition for garments and the like comprising: a closed-cell insulating foam having a plurality of apertures distributed throughout, first and second layers of fabric, one layer on each side of the foam, and stitching pattern throughout the composition causing the first and second layers to be in contact at the apertures in the foam.

In another embodiment a waterproof water-vapour permeable fabric cover is provided adjacent an outer layer of fabric to make the material both waterproof and water-vapour permeable.

BRIEF DESCRIPTION OF DRAWINGS

In drawings which illustrate embodiments of the present invention:

FIG. 1 is a top view of a buoyant insulation composition according to one embodiment of the present invention showing a stitching pattern;

FIG. 2 is a cross-sectional schematic view of the buoyant insulation composition shown in FIG. 1, taken at line 22;

FIG. 3 is a detailed cross-sectional schematic view similar to FIG. 2 showing the stitches;

FIG. 4 is a partial isometric view of the insulation composition shown in FIGS. 1 and 2.

MODES FOR CARRYING OUT THE INVENTION

Referring now to the drawings. A buoyant insulation composition is illustrated in the Figures having a closed-cell insulating foam 10 with a pattern of round apertures 12 provided in the foam to provide evaporative pathways for liquid such as perspiration and water to pass through the material. The apertures are not the closed-cell holes that are already present in the foam. The apertures 12 are preferably punched in the foam. The closed-cell foam 10 is preferably polyvinyl chloride or polyurethane foam. The preferred thickness range is from about 3 to 16 mm.

The apertures in the foam 10 are preferably greater than 1 cm in diameter, in one embodiment 1.1 cm diameter. A pattern of apertures 12 is illustrated in FIG. 1. In this embodiment the apertures 12 are placed in a 2×2 cm grid as shown in FIG. 1. This pattern can be changed in any appropriate manner. It is preferred that the chosen distribution of apertures 12 throughout the foam 10 reduces the volume of the foam by approximately 25%.

A first fabric layer 14 is provided on the outside surface of the foam 10 so that it is adjacent to the environment, and a second fabric layer 16 is provided on the inside of the foam layer 10 so that it is adjacent to the skin. The fabric is wickable, that is to say it absorbs liquid, generally a knit fabric, and preferably a knitted lightweight elastic fabric known under the trade mark LYCRA. The fabric layers 14 and 16 are treated with a hydrophilic finish to assist in absorbing water or perspiration. One type of hydrophilic finish is sold under the trademark INTERA. Different degrees of hydrophillicity between the first fabric layer 14 and the second fabric layer 16 provide a hydrophilic gradient which helps prevent perspiration from wicking in the undesired direction. The first fabric layer 14 is more hydrophilic than the second fabric layer 16.

The first fabric layer 14 and the second fabric layer 16 are separated by the closed-cell foam 10, except where the apertures 12 occur as shown in FIGS. 2, 3 and 4. A stitching pattern 18, as shown in FIG. 1, consists of a grid formed by a plurality of straight lines of stitches 20, substantially parallel to each other. The stitches 20 pass in both directions and are located at every other row of apertures 12. Thus one aperture 12 in every intermediate row does not have stitching 20 passing therethrough. Detail of the stitching is illustrated in FIG. 3. One line of stitches 20 passes through the first fabric layer 14 and the second fabric layer 16 at apertures 12 in the foam 10 thus causing the fabric layers 14 and 16 to be in intimate contact in the apertures 12. This intimate contact increases the passage of water through the composition. The addition of the evaporative apertures 12 with stitching 20 allows the composition to dry faster than a material which is composed of stitching 20 without apertures. The evaporative apertures 12 increase the heat loss through the material during periods in which the garment user experiences higher metabolic heat production due to increased physical activity. These apertures 12 reduce the possibility of overheating.

The stitching lines in one embodiment are substantially parallel, evenly spaced about 4 cm apart and the stitches occur approximately four stitches per centimeter in the lines.

The stitching has another thread 22 woven around the lines of stitching 20 on the top of fabric layer 14. The other thread 22 provides a "highway" which runs along the top surface of layer 4 and spreads moisture along the surface to speed evaporation by distributing the liquid. The fabric layer 14 represents the outside or environment side of the material and in the embodiment shown in FIG. 2 a waterproof water-vapour permeable fabric cover 24 is provided. This may be selected from a number of known composite fabrics that are liquid/water impermeable. The cover 24 may be attached by conventional fabric laminating techniques such as gluing, melting or fusible interlinings.

The thread used for the line of stitching 20 and thread "highway" 22 preferably consists of a cotton/polyester mix, one example being a thread which has 22% cotton and 78% polyester and is known under the trade mark COATS KOBAN TEX 60.

Various changes may be made to the embodiments shown herein without departing from the scope of the present invention which is limited only by the following claims.

The embodiments of the present invention in which an exclusive property or privilege is claimed are defined as follows:

1. A buoyant, insulation composition for garments comprising:
   a closed-cell insulating foam having a plurality of apertures other than closed-cell holes in the foam distributed throughout;
   first and second layers of fabric formed of knitted lightweight elastic fibers and treated with a hydrophilic finish, one layer being on each side of the foam, and
   a stitching pattern through the composition causing the first and second layers to be in contact at the apertures in the foam.

2. The insulation composition according to claim 1 wherein the first layer of elastic fabric is adapted to be an outside layer, and wherein the first layer is more hydrophillic than the second layer.

3. A buoyant, insulation composition for garments comprising:
   a closed-cell insulating foam having a plurality of apertures other than closed-cell holes in the foam distributed throughout, the distribution of said apertures displacing approximately 25% by volume of the foam, and the apertures in the foam being round and having a diameter of at least about 1 cm;
   first and second layers of fabric, one layer on each side of the foam, and
   a stitching pattern through the composition causing the first and second layers to be in contact at the apertures in the foam.

4. The insulation composition according to claim 3 wherein the apertures are provided in a grid approximately 2 cm apart.

5. The insulation composition according to claim 4 wherein the stitching pattern comprises threads in a plurality of straight lines of stitches in two directions and with about four stitches per centimeter, and about four centimeters between adjacent lines of stitches, the stitches extending through every other aperture in the grid.

6. A buoyant, insulation composition for garments comprising:
   a closed-cell insulating foam having a plurality of apertures other than closed-cell holes in the foam distributed throughout;
   first and second layers of elastic fabric, one layer on each side of the foam;
   a waterproof, water-vapour permeable fabric cover adjacent the first layer of elastic fabric, and
   a stitching pattern through the composition causing the first and second layers to be in contact at the apertures in the foam.

7. The insulation composition according to claim 5 wherein the thread comprises cotton and polyester.

8. The insulation composition according to claim 7 wherein the thread consists of 22% cotton and 78% polyester.

9. The insulation composition according to claim 6 wherein the stitching pattern comprises threads in a plurality of straight lines of stitches, the lines substantially parallel and evenly spaced apart and includes another thread woven around each of the stitches between the second layer and the fabric cover to provide a thread highway on the surface of the second layer.

* * * * *